United States Patent [19]
Alden

[11] Patent Number: 5,177,937
[45] Date of Patent: Jan. 12, 1993

[54] METHOD OF AND APPARATUS FOR SEALING CONTAINERS

[76] Inventor: Timothy J. Alden, 16 Manor Cottages, Chells La., Stevenage, Hertfordshire SG2 7AA, England

[21] Appl. No.: 732,970

[22] Filed: Jul. 22, 1991

[30] Foreign Application Priority Data

Jul. 25, 1990 [GB] United Kingdom ............... 9016291

[51] Int. Cl.⁵ ..................... B65B 7/06; B65B 51/14
[52] U.S. Cl. .................................. 53/479; 53/76; 53/374.8
[58] Field of Search ............ 53/479, 76, 373.7, 374.8, 53/375.9, 551; 156/515, 583.1

[56] References Cited

U.S. PATENT DOCUMENTS

| | | | |
|---|---|---|---|
| 2,864,428 | 12/1958 | White | 53/479 X |
| 3,057,129 | 10/1962 | Meissner | 53/479 X |
| 3,583,126 | 6/1971 | McCollough | 53/374.8 X |
| 3,660,959 | 5/1972 | LaFleur | 53/479 X |
| 3,867,226 | 2/1975 | Guido et al. | 53/479 X |
| 3,869,842 | 3/1975 | Verbeke | 53/374.8 X |
| 3,925,139 | 12/1975 | Simmons | 53/374.8 X |
| 4,040,237 | 8/1977 | O'Brien | 53/551 |
| 5,063,727 | 11/1991 | Patelli | 53/374.8 X |

Primary Examiner—Horace M. Culver
Attorney, Agent, or Firm—Seidel, Gonda, Lavorgna & Monaco

[57] ABSTRACT

The open end of a plastics bag or like container is sealed by inserting the open end into the mouth of a sealer which welds the plastics film by the application of heat and pressure. Upon detection of the presence of a bag in the mouth a control unit initiates a sealing cycle. The user has available a film selection switch, linked to the control unit, to enable different film materials to be sealed satisfactorily. The sealing pressure, the sealing temperature and the duration of the sealing action are parameters which affect the sealing. These are independently controllable and presettable to cater for different film materials. The choice of the switch setting causes the control unit to initiate a sealing cycle with appropriate values for each of these parameters.

22 Claims, 3 Drawing Sheets

METHOD OF AND APPARATUS FOR SEALING CONTAINERS

FIELD OF THE INVENTION

This invention relates to methods of and apparatus for sealing bags and other containers, and especially bags and containers of plastics material.

Theft of goods from shops and stores is a continuing problem. One method adopted by the shoplifter is to purchase gods within a store and, after they have been put into a bag at the till, then to use the same bag for hiding other goods which have not been properly purchased. Under those circumstances it may be extremely difficult for a store detective for example to establish easily whether a criminal offence has taken place or not, and therefore be uncertain as to whether to stop the customer for a search.

It is an object of the present invention to provide methods of and apparatus for the sealing of bags and other containers at a point of sale, so that the customer can then no longer use that bag for other items.

There are many other areas where the methods and apparatus of the present invention find application, i.e. where the sealing of a bag or container is a desirable ancillary to the purchase of goods. For example, the purchase of take-away food would benefit from sealing of the bags, as would also the sealing of plastics bags containing "loose" fruit and vegetables, such as is conventional now in stores and supermarkets. The sealing of goods purchased at delicatessen counters in stores and supermarkets would also benefit from the present invention. Yet a further example where the sealing of a plastics bag would be desirable is in the field of dry cleaning, where clothing items are normally returned to the customer in an open-ended plastics bag. Yet a further area in which the invention can be used is in the sealing of documents within plastics bags, for example for security or to preserve confidentiality. In these and many other areas the sealing method and apparatus of the present invention is applicable.

Various methods for sealing bags of plastics material are known. Examples of these are to be found in U.S. Pat. No. 3869842 and U.S. Pat. No. 3867226. The former describes a relatively small apparatus which can be located at a check-out station or till, while the latter describes portable hand-held impulse sealer. In both cases the sealing of the bag is effected by the application of heat for a controllable period.

SUMMARY OF THE INVENTION

It is an object of the present invention to provide a method of and apparatus for sealing bags and other like containers of plastics material which can cope with a wide variety of different types of bag material. The plastics materials used for bags can be transparent, translucent or opaque. They can be of high density plastics material or low density plastics material and have different grades in each category. An apparatus which is set up satisfactorily to seal a bag of one particular plastics material will not function satisfactorily for a different plastics material. Therefore, it has previously been impossible to provide a product which is able to seal bags having a wide range of material properties.

It is an object of the present invention to provide a method of and apparatus for sealing bags or other like containers which overcomes these problems by controlling the parameters which govern the nature of the seal which is effected. I have established that not only is it necessary to control the sealing time and sealing temperature, but also the sealing pressure, in order to obtain satisfactory seals. It is the pressure in particular which must be controlled from one type of bag material to another if satisfactory sealing is achieved.

Therefore, in accordance with the present invention, there is provided a method of sealing a bag or other container of plastics material which comprises bringing a sealing element into contact with the bag material with the application of heat and pressure thereby to effect a seal across at least a part of the width of the bag, and controlling the sealing pressure in dependence upon the nature of the plastics material.

Preferably, the method includes independently controlling the sealing temperature and the sealing time as well as the sealing pressure in dependence upon the nature of the plastics material.

In a preferred embodiment, the sealing pressure, sealing temperature and sealing time are all preset for different predetermined plastics materials, and operation of switch means in dependence upon the need to seal a particular material automatically causes the appropriate values of all three parameters to be made effective.

Also in accordance with the present invention there is provided apparatus for the sealing of a bag or other container of plastics material, comprising means defining a mouth for receiving an open margin of a bag or other container, sealing means displaceable into contact with the bag material with the application of heat and pressure thereby to effect a seal across at least a part of the width of the bag, and means to control the sealing pressure in dependence upon the nature of the plastics material.

Preferably, the apparatus includes control means presettable in respect of the sealing temperature, sealing time and sealing pressure in dependence upon the nature of the plastics material.

The apparatus preferably includes a selection switch which, upon actuation in dependence upon the need to seal a particular material, automatically causes the appropriate values of pressure, temperature and time to be made effective. Therefore, the user simply has to choose the appropriate setting on the selection switch and the control means of the apparatus will automatically select the values of these parameters appropriate for the chosen material.

Control of the pressure exerted on the bag material is preferably effected by mechanical means, for example a cam driven from a solenoid.

In a preferred embodiment of the invention the seal is effected as a continuous seal across the central portion of the width of the bag, leaving a marginal unsealed zone at each side of the bag of for example about 3 cm in length. The sides of the bag are left unsealed in order to prevent undesirable ballooning of the bag. Also, the side portions of the bag can then be grasped by the user to draw the bag into the mouth of the apparatus.

The sealing pressure, temperature and time will depend in each case upon the material of the bag, and in particular on the density of the plastics material.

BRIEF DESCRIPTION OF THE DRAWINGS

In order that the invention may be more fully understood, one presently preferred embodiment of apparatus in accordance with the invention will now be described by way of example and with reference to the accompanying drawings, in which.

DESCRIPTION OF THE PREFERRED EMBODIMENT

Figure 3:
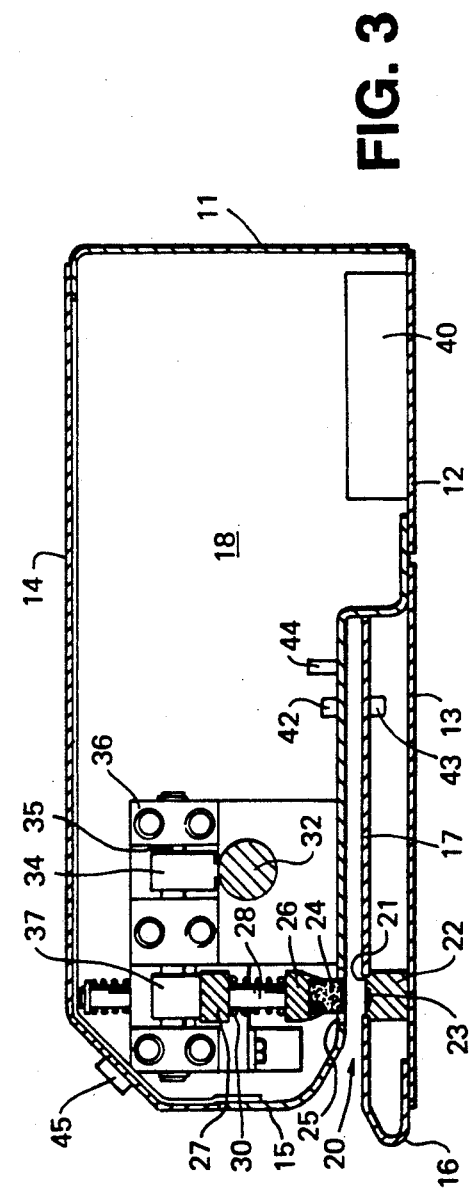
FIG. 3 is a sectional view taken along the line III—III in FIG. 2.

As shown in the drawings, the sealing apparatus of the present invention comprises a housing, indicated generally at 10. The housing can be made for example of moulded plastics material or alternatively of sheet metal pieces suitably secured together. As shown in the drawings, the housing comprises a rear wall 11, a base rear portion 12, a base front portion 13, a cover 14, a front portion 15 which extends down from the lower front edge of the cover and then extends rearwards parallel to the cover until it turns down and is secured to bridge the junction between the base front portion and base rear portion, and a guide portion 16 which is positioned below the front portion 15 and which has a top wall 17 which extends horizontally and which terminates in abutment against the downturned part of the front portion 15. The housing 10 also includes side walls 18 and 19. The front portion 15 and guide portion 16 together define an open-ended, horizontally extending mouth 20 which extends the full length of the housing, i.e. into the plane of the drawing as shown in FIG. 3. The open edge of a bag of plastics material can thus be gripped at the corners of the bag and drawn into the mouth 20, to be sealed.

Figure 2:
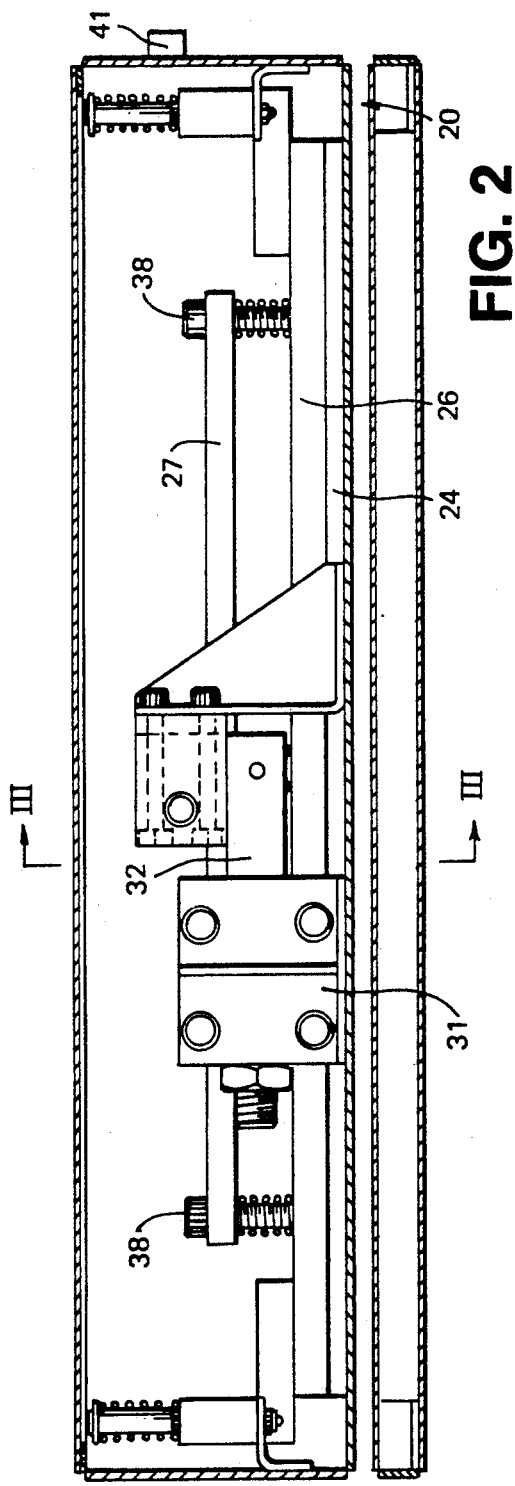
FIG. 2 is a sectional view taken along the line II—II in FIG. 1.

The guide portion 16 is provided with an elongate slot 21 therein. Beneath the slot and closing the slot is a block 22 of thermally insulating material, such as PTFE for example. Embedded in the upper surface of the block 22 is a heating element 23. Positioned above the heating element 23 is a sealing head 24 which is capable of vertical movement through a slot 25 in the horizontally extending portion of the front housing portion 15. The sealing head 24 comprises an elongate block carried by a lower support bar 26. As will be seen most clearly from FIG. 2, the sealing head 24 and lower support bar 26 extend lengthwise to positions which are just short of the side walls 18 and 19 of the apparatus, thus permitting the user to insert the bag into the mouth 20 without danger of the fingers being trapped or touched by the sealing means.

Vertically above the support bar 26 is an elongate press bar 27. The press bar 27 is shorter than the support bar 26. The support bar 26 has three upstanding guide rods 28 which extend up into holes 29 provided in the press bar 27, as shown most clearly in FIG. 4. Springs 30 are provided around each guide rod 29, seated at one end against the upper surface of the support bar 26 and at the other end against the underside of the press bar 27. These springs 30 serve as return springs.

Figure 1:
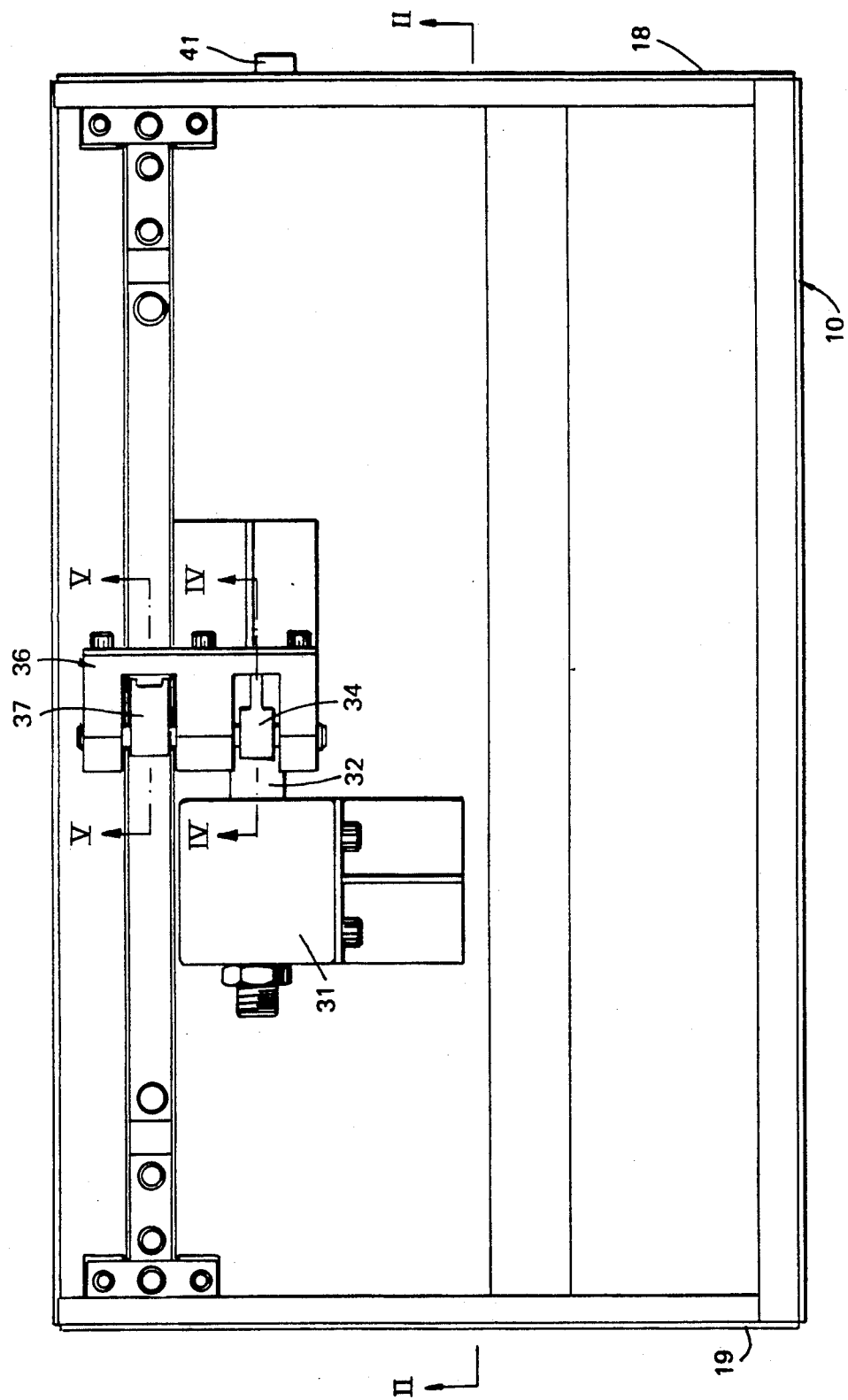
FIG. 1 is a top plan view of the sealing apparatus, with the top of the housing and with other parts omitted.
Figure 4:
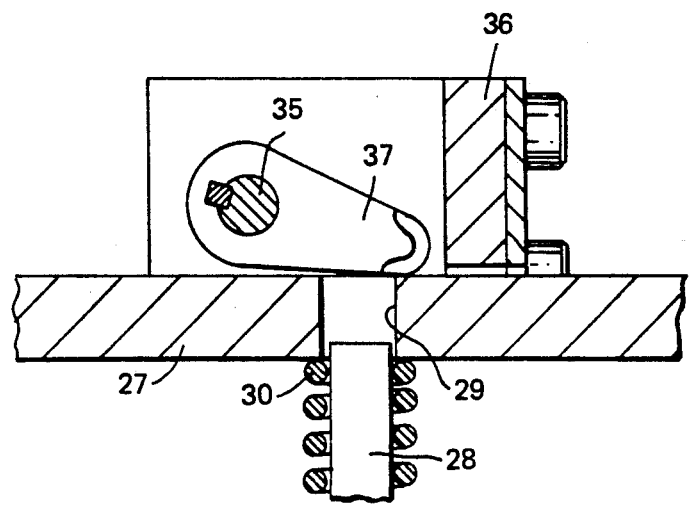
FIG. 4 is a part-sectional view, on an enlarged scale, taken along the line IV—IV in FIG. 1; and, FIG. 5 is a part-sectional view, on an enlarged scale, taken along the line V—V in FIG. 1.
Figure 5:
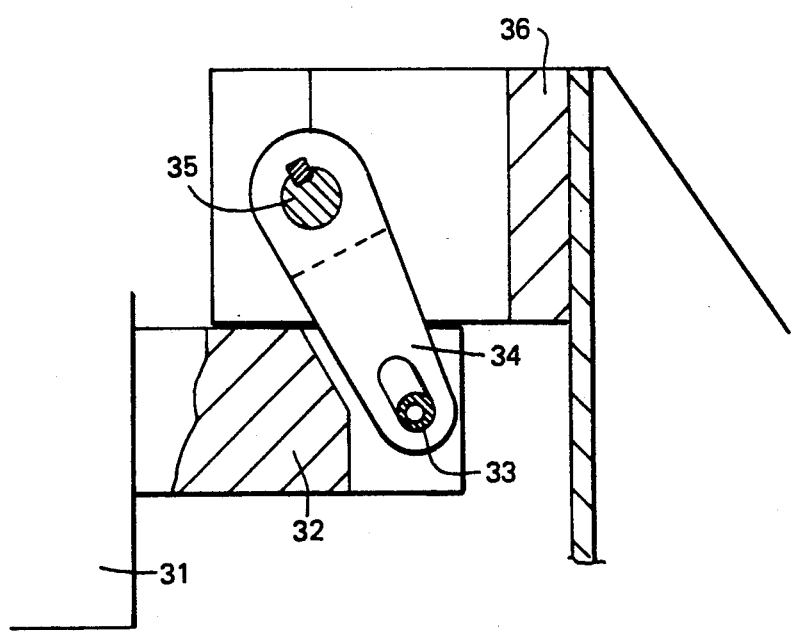

The means for controlling movement of the sealing head assembly will now be described. The operation of the sealing head assembly is powered by a solenoid 31 which has an armature rod 32 extending therefrom and displaceable horizontally, as viewed in the drawings. The armature rod 32 is provided at its free end, in a slotted recess, with a pin 33 which is located within a slot adjacent to one end of a link member 34 whose other end is secured to a shaft 35. The shaft 35 extends horizontally, at right-angles to the lengthwise direction of the apparatus, and is mounted in a support bracket 36 by means of suitable bearings (not shown). The shaft 35 carries, secured thereto, a cam 37 which is shown most clearly in FIG. 4. The cam 37 is recessed towards its smaller end, as shown in FIGS. 1 and 4. The smaller end of the cam 37 rests on the upper surface of the press bar 27, over the hole 29 through which the centre guide rod 28 is displaceable. The two outer guide rods 28 are each provided at their upper ends with screw-threaded portions engageable with knurled caps 38 by rotation of which the press bar 27 can be pushed down against the force of the springs 30.

Positioned within the housing is a control unit, indicated generally at 40. The control electronics are designed to give the sealing apparatus flexibility and compatibility with most commercially available plastics film materials. A film selection switch 41 is provided externally on one of the side walls of the housing. The switch 41 provides the user with a choice of settings, depending upon the type of film material which the user wishes to seal. For example, there could be settings for film material of particular opacity, transparency, colour, density, etc. The control unit 40 is linked to the switch 41 and responds to any given switch setting by controlling three variables or parameters which affect the sealing of the bag material. The three parameters are the sealing pressure, the sealing temperature and the sealing time. The control unit 40 also determines the initial delay, i.e. the time period from initiation of the sealing cycle to the initiation of the actual welding sequence, in order to enable the user properly to position the bag within the mouth 20 of the apparatus. These four variables are independently controllable and are presettable. For each bag material, each variable is set in the apparatus for maximum efficiency of sealing and the control unit 40 will instruct the appropriate actions in response to the choice of a particular setting of the switch 41.

The initial delay, i.e. the time from initiation of a sealing cycle by the operator to the actual beginning of the welding process by the apparatus, is determined by an appropriate timing circuit within the control unit. Of the three parameters of pressure, temperature and time, in relation to the actual sealing step, it is the pressure which is exerted against the film which I consider to be the most important. This is the pressure with which the sealing head 24 presses down against the base plate 22 with the film therebetween, throughout the sealing cycle. This pressure is generated by the downward movement of the sealing head assembly, which in turn is controlled by the motion of the cam 37 in response to actuation of the solenoid 31. The pressure is dependent upon the downward displacement distance of the sealing head assembly, and the control unit 40 is arranged to control both the solenoid 31 and the rotation of the cam 37 to generate the required displacement. The temperature at which the sealing takes place is dependent upon the length of time for which the heating element 23 is provided with electric current and again is controlled by timing means within the control unit 40. Similarly, further timing means within the control unit 40 govern the sealing time, i.e. the length of time for which the bag material is held clamped between the sealing head components with the application of heat and pressure thereto. Temperature control is preferably effective to within one half of a degree centigrade. The control unit 40 also includes means to counter "drifting" of the preset variables with the passage of time. This is to ensure consistency of sealing.

The sealing apparatus includes means to detect the presence of a bag within the mouth 20. Preferably, a combination of photoelectric and mechanical sensors are provided. As shown in FIG. 3, within the mouth 20, inwardly of the sealing head assembly, are a plurality of light emitting diodes 42 in alignment with light-sensitive cells 43. These are spaced along the length of the mouth 20. A microswitch 44 is also provided within the mouth of the apparatus which is mechanically actuated upon insertion of a bag into the mouth. The microswitch 44 includes a sensing blade which is displaced by the insertion of the bag. A mechanical sensor such as the microswitch is required if one is sealing transparent or translucent bags which will not properly activate the photoelectric sensors 42, 43. Alternatively, and/or additionally, one can provide a foot-operated switch connected to the apparatus. Then, when the user has inserted a bag into the mouth 20 the foot switch is depressed and triggers the sealing cycle.

On the front of the apparatus is provided an indicator 45 for the operator. This is preferably an LED display which indicates the status of the apparatus. For example, a green LED can be used to indicate that the system is ready to receive a section of film, and a red LED can be used to indicate that a sealing cycle is in progress. On completion of the sealing cycle the green LED will then be displayed again.

In operation, on initiation of a sealing cycle, the solenoid 31 will be activated after the initial preset delay period. This causes rotation of the drive cam assembly via what is a linear linkage. The drive cam 37 forces the sealing head assembly downwards to clamp the film material between the sealing head 24 and the base block 22, with the appropriate pressure. The heating element 23 is energised under the control of the control unit 40 and the sealing is completed as determined by the electronics of the control unit. Thereafter, the solenoid is de-activated and the heating element de-energised. The return springs 30 then return the sealing head assembly to its original, passive position, thereby releasing the sealed bag.

The sealing apparatus of the present invention can be used to seal plastics film, to create an enclosure, in various ways. In the case of a carrier bag for example, the seal is preferably made across the greater part of the width of the bag, leaving a marginal zone of perhaps 3 cm on each side of the bag which is unsealed, in order to prevent undesirable ballooning of the bag. In the case of a carrier bag where the bag material has a hole therein adjacent to the free edge to serve as a carrying handle, the seal is made across the bag below the hole, for example about 75 mm away from the free edge of the bag. In the case of the sealing of a document in a sealed enclosure, the bag can be sealed across the full width and at a distance of about 4 mm from the free edge.

Although the apparatus as shown in the drawings is designed to be fitted to a horizontal counter or shelf, the apparatus could alternatively be mounted on a wall, with the receiving mouth for the bag being directed downwards so that the user would raise the bag up into the mouth for sealing to take place.

Although as described above the sealing is effected by a bar heated electrically, alternative means of effecting the welding together of the sides of the bag, for example using ultrasonic welding, could be used.

I claim:
1. A method of sealing at least one opened end of a plastic container, said method comprises the steps of:
   (a) bringing a sealing element into contact with said plastic container's at least one opened end, said sealing element applying a specific amount of sealing heat and sealing pressure to effect a seal across at least a part of the width of said plastic container;
   (b) controlling said sealing pressure applied by said sealing element in dependence upon the physical and compositional nature of said plastic container to effect a seal across at least a part of the width of said plastic container's at least one opened end; and
   (c) independently controlling said sealing temperature and the sealing time in dependence on the physical and compositional nature of said plastic container.

2. A method as recited in claim 1, wherein said sealing pressure, sealing temperature and sealing time parameters are all preset for a plurality of different plastic containers based upon each of said plurality of different plastic container's physical and compositional nature, and wherein the operation of a switch means, in dependence upon the need to seal one of said plurality of different plastic containers automatically causes the appropriate value of said sealing pressure, sealing temperature and sealing time parameters to be made effective.

3. A method as recited in claim 1, wherein said sealing pressure is generated by the displacement of said sealing element under the control of cam means driven from a solenoid.

4. A method as recited in claim 1 wherein said seal is effected as a continuous seal across the central portion of the width of said plastic container's at least one end, leaving a marginal unsealed zone at each side of said plastic container's at least one opened end.

5. Apparatus for sealing at least one opened end of a plastic container, comprising:
   (a) means defining a mouth for receiving said plastic container's at least one opened end;
   (b) sealing means displaceable to contact with said plastic container's at least one opened end, said sealing means applying a variable amount of sealing heat and sealing pressure to said plastic container's at least one opened end to effect a seal;
   (c) means to control said sealing pressure in dependence upon the physical and compositional nature of said plastic container; and
   (d) control means presetable in respect of said sealing temperature, sealing time and sealing pressure in dependence on the physical and compositional nature of said plastic container.

6. Apparatus as recited in claim 5, further comprising selection switch means which, upon actuation in dependence upon the need to seal a particular plastic container, automatically causes the appropriate values of said sealing pressure, sealing temperature and sealing time to be made effective.

7. Apparatus as recited in claim 5, further comprising:

(a) a sealing head assembly displaceable towards and away from said plastic container's at least one opened end;

(b) cam means operative on said sealing head assembly to effect the displacement of said sealing head assembly towards said plastic container's at least one opened end; and (c) a solenoid arranged to control rotation of said cam means by way of a connecting linkage.

8. Apparatus as recited in claim 5, further comprising means to control a delay time prior to the commencement of a sealing cycle.

9. Apparatus as recited in claim 5, further comprising sensor means to detect the presence of said plastic container in said sealing apparatus's mouth.

10. Apparatus as recited in claim 9, wherein said sensor means comprises photoelectric and mechanical sensing means.

11. Apparatus as recited in claim 5, wherein the length of said sealing means is such that said sealing means will seal the major part of the width of said plastic container's at least one opened end, leaving unsealed portions at each side thereof.

12. A method of sealing at least one opened end of a plastic container by utilizing a sealing apparatus comprising means defining a mouth for receiving said plastic container's at least one opened end, sealing means displaceable into contact with said plastic container's at least one opened end, said sealing means applying a variable amount of sealing heat and sealing pressure to said plastic container's at least one opened end to effect a seal, and means to control said sealing pressure in dependence upon the physical and compositional nature of said plastic container, said method comprises the steps of:

(a) positioning said plastic container's at least one opened end into said sealing apparatus's mouth;

(b) displacing said sealing apparatus's sealing means such that said sealing means comes into contact with said plastic container's at least one opened end;

(c) controlling said sealing pressure applied by said sealing means in dependence upon the physical and compositional nature of said plastic container to effect a seal across at least a part of the width of said plastic container's at least one opened end; and (d) independently controlling said sealing temperature and the sealing time in dependence on the physical and compositional nature of said plastic container.

13. A method as recited in claim 12, wherein said sealing pressure, sealing temperature and sealing time parameters are all preset for a plurality of different plastic container's based upon each of said plurality of different plastic container's physical and compositional nature, and wherein the operation of a switch means, in dependence upon the need to seal one of said plurality of different plastic container, automatically causes the appropriate values of said sealing pressure, sealing temperature and sealing time parameters to be made effective.

14. A method as recited in claim 12, wherein said sealing pressure is generated by the displacement of said sealing element under the control of cam means driven from a solenoid.

15. A method as recited in claim 12 wherein said seal is effected as a continuous seal across the central portion of the width of said plastic container's at least one end, leaving a marginal unsealed zone at each side of said plastic container's at least one opened end.

16. Apparatus for sealing at least one opened end of a plastic container comprising:

(a) means defining a mouth for receiving said plastic container's at least one opened end;

(b) sealing means displaceable into contact with said plastic container's at least one opened end, said sealing means applying a variable amount of sealing heat and sealing pressure to said plastic container's at least one opened end to effect a seal;

(c) means to control said sealing pressure in dependence upon the physical and compositional nature of said plastic container; and (d) control means presetable in respect of said sealing temperature and sealing pressure in dependence on the physical and compositional nature of said plastic container.

17. Apparatus as recited in claim 16, further comprising selection switch means which, upon actuation in dependence upon the need to seal a particular plastic container, automatically causes the appropriate values of said sealing pressure, sealing temperature and sealing time to be made effective.

18. Apparatus as recited in claim 16, further comprising:

(a) a sealing head assembly displaceable towards and away from said plastic container's at least one opened end when said plastic container is positioned into said sealing apparatus's mouth;

(b) cam means operative on said sealing head assembly to effect the displacement of said sealing head assembly towards said plastic container's at least one opened end when fitted into said sealing apparatus's mouth; and (c) a solenoid arranged to control rotation of said cam means by way of a connecting linkage.

19. Apparatus as recited in claim 16, further comprising means to control a delay time prior to the commencement of a sealing cycle.

20. Apparatus as recited in claim 16, further comprising sensor means to detect the presence of said plastic container in said sealing apparatus's mouth.

21. Apparatus as recited in claim 20, wherein said sensor means comprises photoelectric and mechanical sensing means.

22. Apparatus as recited in claim 16, wherein the length of said sealing means is such that said sealing means will seal the major part of the width of said plastic container's at least one opened end, leaving unsealed portions at each side thereof.

* * * * *